United States Patent
Kawashima

(10) Patent No.: US 8,251,503 B2
(45) Date of Patent: Aug. 28, 2012

(54) NONAQUEOUS INK JET INK, PROCESS FOR PRODUCING NONAQUEOUS INK JET INK, AND INK JET RECORDING METHOD

(75) Inventor: Kouki Kawashima, Tokyo (JP)

(73) Assignee: Konica Minolta IJ Technologies, Inc., Tokyo (JP)

(*) Notice: Subject to any disclaimer, the term of this patent is extended or adjusted under 35 U.S.C. 154(b) by 198 days.

(21) Appl. No.: 12/935,602

(22) PCT Filed: Mar. 26, 2009

(86) PCT No.: PCT/JP2009/056090
§ 371 (c)(1), (2), (4) Date: Sep. 30, 2010

(87) PCT Pub. No.: WO2009/123008
PCT Pub. Date: Oct. 8, 2009

(65) Prior Publication Data
US 2011/0018929 A1   Jan. 27, 2011

(30) Foreign Application Priority Data

Apr. 4, 2008   (JP) ................................. 2008-098085

(51) Int. Cl.
*B41J 2/17* (2006.01)
(52) U.S. Cl. ............................... 347/95; 347/20; 347/56
(58) Field of Classification Search ............ 347/20, 347/56, 95, 100; 106/31.6, 31.13, 31.27; 523/160, 161
See application file for complete search history.

(56) References Cited

U.S. PATENT DOCUMENTS 6,010,564 A * 1/2000 Zhu et al. ............. 106/31.37

FOREIGN PATENT DOCUMENTS

| | | |
|---|---|---|
| JP | 03095205 | 4/1991 |
| JP | 2002526631 | 8/2002 |
| JP | 2005-015672 | 1/2005 |
| JP | 200523100 | 1/2005 |
| JP | 200536199 | 2/2005 |
| JP | 2005036048 | 2/2005 |
| JP | 200560716 | 3/2005 |
| JP | 2006225673 | 8/2006 |
| JP | 2007197686 | 8/2007 |
| JP | 2007245432 | 9/2007 |
| JP | 2007291257 | 11/2007 |
| JP | 200873983 | 4/2008 |
| JP | 2007224293 | 9/2010 |
| WO | 2004007626 | 1/2004 |

* cited by examiner

Primary Examiner — Juanita D Jackson
(74) Attorney, Agent, or Firm — Lucas & Mercanti, LLP

(57) ABSTRACT

Disclosed is a nonaqueous ink jet ink that is suitable for printing (scratch resistance and resistance to alcohol wiping) on recording media of plastics such as polyvinyl chloride, is highly safe, can be used without posing any problem of odor, has excellent properties of ink ejection from an ink jet head, and can realize a good printed image quality. Also disclosed are a process for producing a nonaqueous ink jet ink and an ink jet recording method using the nonaqueous ink jet ink. The process for producing a nonaqueous ink jet ink is a process for producing a nonaqueous ink jet ink containing at least an organic solvent, a pigment, and a fixing resin. The process is characterized in that the fixing resin satisfies a b/a value of not more than 0.020 wherein a represents the tall of integrated values of areas of all of peaks derived from the fixing resin among all of peaks detected in a proton nuclear magnetic resonance analysis; and b represents the total of integrated values of areas of all of peaks derived from the compounds other than the fixing resin.

15 Claims, No Drawings

NONAQUEOUS INK JET INK, PROCESS FOR PRODUCING NONAQUEOUS INK JET INK, AND INK JET RECORDING METHOD

This is a 371 of PCT/JP2009/056090 filed Mar. 26, 2009 which in turn claimed the priority of Japanese Patent Application No. 2008-098085 filed Apr. 4, 2008, both applications are incorporated by reference herein.

TECHNICAL FIELD

The present invention relates to a novel non-aqueous ink-jet ink, a method for producing a non-aqueous ink-jet ink and an ink-jet recording method.

BACKGROUND

Recently, an ink-jet recording method has been applied in various fields of printing works such as photograph imaging, various types of printings, markings and a specific printing such as a color filter because it enables to form an image easily and at small cost.

As ink-jet inks used for the ink-jet recording method, there are various types of ink such as an aqueous ink containing water as a principal solvent, an oil-based ink principally containing a non-volatile solvent at room temperature and substantially containing no water, a non-aqueous ink principally containing a solvent volatile at room temperature and substantially containing no water, a hot-melt ink which is solid at room temperature and thermally melted for printing and an active light curable ink capable of curing by active rays such as light. They are selected in accordance with the use.

Besides, as a recording medium used for outdoor notice board which is required to have weather resistance for a long period, and for a printing material which is required to have an ability of contacting with a curved surface, recording mediums made of plastics such as polyvinyl chloride and polyethylene are used. Particularly, a medium made of soft polyvinyl chloride is used in various fields of use. The ink-jet recording method is applied as a method suitable for making small amount and diverse kinds of printing matters since plate making is not necessary and the time for finishing is short by this system, though there are many methods to print an image on a soft polyvinyl chloride medium.

Hitherto, a non-aqueous ink containing cyclohexanone as the principal solvent is used on the occasion of printing on soft polyvinyl chloride. For example, an ink-jet ink containing cyclohexanone is disclosed (cf. Patent Document 1). Cyclohexanone has high dissolving ability for soft polyvinyl chloride so that the pigment contained in the ink will enter into soft polyvinyl chloride. Therefore, high abrasion resistance and high glossiness of the printed matter can be obtained. However, cyclohexanone has relatively high toxicity and exhibits high vapor pressure. It has not only some problems of safety but also a defect that a local exhausting system is necessary when the ink-jet ink containing cyclohexanone is handled.

In contrast to that, non-aqueous ink containing no cyclohexanone is developed and marketed. For example, there are disclosed non-aqueous inks containing an organic solvent such as N-methylpyrrolidone or amide as a solvent which is capable of dissolving polyvinyl chloride in place of cyclohexanone causing the above problems (cf. Patent Documents 2 and 3). Moreover, there is disclosed a non-aqueous ink containing a fixing resin such as a vinyl chloride-vinyl acetate copolymer or an acrylic resin for improving the fastness of the image such as abrasion resistance (cf. Patent Documents 4 and 5). By these constitution, it can be obtained an ink-jet ink which is inhibited the odor to some extent and has the abrasion resistivity of image formed thereby on polyvinyl chloride medium. However, the above-mentioned ink will often cause problems of ejection from an ink-jet head, which will results in degradation of printing image. A current status is that there is not yet obtained a non-aqueous ink-jet ink which has resolved the problems of safety and odor, and fully provided with abrasion resistance, and excellent in ejection characteristics from an ink jet head to produce a good printing image.

Patent Document 1: Japanese translation of PCT international application No. 2002-526631
Patent Document 2: Unexamined Japanese Patent Application (hereinafter, refers to as JP-A) No. 2005-15672
Patent Document 3: JP-A No. 2005-60716
Patent Document 4: JP-A No. 2005-36199
Patent Document 5: WO 2004/007626

DISCLOSURE OF THE INVENTION

Problems to be Solved by the Invention

The present invention has been achieved based on the above-described problems. An object of the present invention is to provide a non-aqueous ink-jet ink which has printing suitability (abrasion resistance and resistivity to wiping with alcohol) for a plastic recording medium such as a polyvinyl chloride recording medium and is excellent in safety without problem of odor and is excellent in ejection property from an ink-jet head to form a good printing image. An object of the present invention is also to provide a method for producing a non-aqueous ink-jet ink and an ink-jet recording method.

Means to Solve the Problems

The above object of the present invention can be attained by the following constitution.

1. A method for producing a non-aqueous ink jet ink comprising the step of: assembling at least an organic solvent, a pigment and a fixing resin, wherein the fixing resin exhibits a "b/a" value of 0.020 or less, provided that "a" represents a total integrated value of areas of all peaks derived from the fixing resin among all peaks detected by a proton nuclear magnetic resonance analysis; and "b" represents a total integrated value of areas of all peaks derived from a foreign compound contained in the fixing resin.
2. The method for producing a non-aqueous ink-jet ink of the foregoing item 1, wherein the fixing resin exhibits the "b/a" value of 0.010 or less.
3. The method for producing a non-aqueous ink-jet ink of the foregoing items 1 or 2, wherein the fixing resin is an acrylic resin or a vinyl chloride-vinyl acetate copolymer resin.
4. The method for producing a non-aqueous ink-jet ink of any one of the foregoing items 1 to 3, wherein the fixing resin is a resin produced by a suspension polymerization method or a solution polymerization method.
5. The method for producing a non-aqueous ink-jet ink of any one of the foregoing items 1 to 4, wherein the non-aqueous ink-jet ink contains Compound (B) comprising at least one compound selected from the group consisting of compounds represented by Formula (1) and Formula (2) in an amount of 1.5% by mass to 30% by mass.

Formula (1)

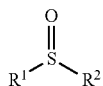

Wherein $R^1$ and $R^2$ each independently represent a group having 1 to 6 carbon atoms, and $R^1$ and $R^2$ may be joined to form a ring.

Formula (2)

Wherein $R^3$ and $R^4$ each independently represent a group having 1 to 6 carbon atoms, and $R^3$ and $R^4$ may be joined to form a ring.

6. The method for producing a non-aqueous ink-jet ink of any one of the foregoing items 1 to 5, wherein the non-aqueous ink-jet ink contains Solvent (A) comprising at least one compound selected from the group consisting of compounds represented by Formula (3) and Formula (4) in an amount of 50% by mass to 90% by mass.

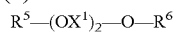

Formula (3)

Wherein $R^5$ and $R^6$ each independently represent a methyl group or an ethyl group; and $OX^1$ represents an oxyethylene group or an oxypropylene group.

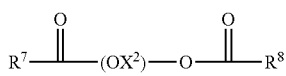

Formula (4)

Wherein $R^7$ and $R^8$ each independently represent a methyl group or an ethyl group; and $OX^2$ represents an oxyethylene group or an oxypropylene group.

7. The method for producing a non-aqueous ink-jet ink of any one of the foregoing items 1 to 6, wherein the non-aqueous ink-jet ink contains a condensed compound made of a polyallylamine and a polyester having a free carboxylic acid group.
8. The method for producing a non-aqueous ink-jet ink of any one of the foregoing items 1 to 7, wherein the non-aqueous ink-jet ink contains a pigment derivative having an acid group.
9. A non-aqueous ink-jet ink produced by the method of any one of the foregoing items 1 to 8, wherein a content of the foreign compound contained in the fixing resin is 0.1% by mass or less based on the total weight of the non-aqueous ink-jet ink when the foreign compound is detected by a proton nuclear magnetic resonance analysis.
10. An ink-jet recording method comprising the step of forming an image on a recording medium by using the non-aqueous ink-jet ink of the foregoing item 9, wherein the recording medium is at least one selected from the group consisting of a polyvinyl chloride substrate, a resin substrate without a plasticizer and a non-absorbing inorganic substrate as a constituting element of the recording medium.

Effects of the Invention

The present invention made it possible to provide a method for producing a non-aqueous ink-jet ink which has printing suitability (abrasion resistance and resistivity to wiping with alcohol) for a plastic recording medium such as polyvinyl chloride recording medium and is excellent in safety without problem of odor and is excellent in ejection property from an ink-jet head to form a good printing image. The present invention also made it possible to provide an ink-jet recording method.

BEST EMBODIMENTS TO CARRY OUT THE INVENTION

The best embodiments for embodying the present invention will be described in detail below.

As a result of intensive investigations by the present inventor with respect to the above-described problems, it was found to realize a method for producing a non-aqueous ink-jet ink having the following properties. The non-aqueous ink-jet ink contains at least an organic solvent, a pigment and a fixing resin, and it is characterized in containing the fixing resin exhibiting a "b/a" value of 0.020 or less, provided that "a" represents a total integrated value of areas of all peaks derived from the fixing resin among all peaks detected by a proton nuclear magnetic resonance analysis; and "b" represents a total integrated value of areas of all peaks derived from a foreign compound contained in the fixing resin. The above-described non-aqueous ink-jet ink exhibits printing suitability (abrasion resistance and resistivity to wiping with alcohol) for a plastic recording medium such as polyvinyl chloride recording medium, or for a non-absorbing recording medium such as polyethylene terephthalate, polyethylene, polypropylene, metal, glass, or ceramic, and it is excellent in safety without problem of odor and is excellent in ejection property from an ink-jet head to form a good printing image.

The composition of the non-aqueous ink-jet ink according to the present invention will be specifically described below. In the present invention, "a non-aqueous ink-jet ink" designates an ink-jet ink which contains a volatile solvent at room temperature as a main component and substantially water is not contained in the ink.

The non-aqueous ink-jet ink according to the present invention (hereafter, it is also called as an ink-jet ink or an ink) contains at least an organic solvent, a pigment and a fixing resin. The non-aqueous ink-jet ink of the present invention is characterized by being produced using the fixing resin satisfying the following properties. The fixing resin exhibits a "b/a" value of 0.020 or less, provided that "a" represents a total integrated value of areas of all peaks derived from the fixing resin among all peaks detected by a proton nuclear magnetic resonance analysis; and "b" represents a total integrated value of areas of all peaks derived from a foreign compound contained in the fixing resin.

The present inventor made a detailed investigation with respect to the kinds of the fixing resins, their properties, and ejection property of the ink-jet ink using these fixing resins. As a result, it was found that even if the same kind of fixing resin was used, there were produced a large difference of performance in the ejection characteristics of the ink-jet ink. The specific phenomenon in which the difference of performance in ejection characteristics was observed was as follows. When the ink-jet ink is ejected thorough the ink-jet nozzles as a droplet (this droplet is called as a main droplet in the present invention) and reaches a recording medium, it may be produced a large number of minute droplets (this minute droplet is called a satellite droplet), the produced large number of satellite droplets will reach the target around the location of the recording medium which the main droplet reaches, and a printing image will be stained. This phenomenon is called "splash" in the present invention.

Then, the present inventor further made a detailed analysis in order to know which kind of properties of the resin used in the ink will be related to the degree of splash. As a result, it was found that the degree of splash was strongly related with the ratio of "b/a", and the present invention was achieved. Here, "a" represents a total integrated value of areas of all peaks derived from the fixing resin among all peaks detected by a proton nuclear magnetic resonance analysis; and "b" represents a total integrated value of areas of all peaks derived from a foreign compound contained in the fixing resin.

That is, when the fixing resin exhibiting "b/a" exceeding 0.020 is used, it becomes easy to generate satellites rapidly and generation of satellites is effectively suppressed when the fixing resin exhibiting "b/a" of 0.020 or less is used. It is more preferable that "b/a" is 0.010 or less, and it is most preferable that "b/a" is 0. This is the case where the peak originated from the compound other than the fixing resin is not detected.

In addition, the present inventor found that there was obtained un unexpected effect that the glossiness of an image formation part becomes very good, and also an effect that the decap property in the case of ejection is extremely excellent, when the fixing resin having "b/a" of 0.020 or less is used, which is a parameter concerning the present invention.

Here, the decap property in the present invention designates the followings. One is a phenomenon in which the succeeding ink droplet to be ejected causes poor ejection when the ink is continuously ejected and the interval between a certain ink droplet and injection of the following ink droplet is long. The other is a phenomenon in which even if the ink droplet is ejected, the flight velocity and flying direction are deteriorated remarkably compared with the normal ejection characteristics of ink droplets.

Furthermore, ejection stability, and abrasion resistance and alcohol wiping resistance were able to be raised with sufficient balance by adding the fixing resin of the present invention to the ink of the present invention.

Alcohol wiping resistance of the present invention designates the resistance of an image when the image surface is wiped off with ethanol or a mixture of ethanol and water. It is the resistance to the turbulence such as picture image peeling. It is a need required by the user to wipe off the dirt of an image surface with alcohol when the image is a poster displayed outdoors.

The fixing resin according to the present invention is characterized in that it exhibits "b/a" of 0.020 or less, provided that "a" represents a total integrated value of areas of all peaks derived from the fixing resin among all peaks detected by a proton nuclear magnetic resonance analysis; and "b" represents a total integrated value of areas of all peaks derived from a foreign compound contained in the fixing resin. Specific analysis method of the fixing resin with a proton nuclear magnetic resonance method will be described below.

In the present invention, although there is no restriction in particular as a tool of analysis of the fixing resin by a proton nuclear magnetic resonance method, "b/a" was calculated in accordance with the way shown below.

One gram of a fixing resin was refluxed in 30 ml of methanol for 3 hours. The soluble component in methanol was concentrated to be solidified. The deuterated methanol soluble component of this extraction ingredient was subjected to 1 H NMR measurement at room temperature with Lambda 400 nuclear magnetic resonance apparatus (model number JNM-LA400, made by JEOL Ltd.).

From the result obtained by the measurement, the total integrated area value was calculated for all of the detected peaks. And the ratio of "a" which is a sum value of all the integrated area values of the peak originated from the fixing resin, to "b" which is a sum value of all the integrated area values of the peak of the compound originated from those other than the fixing resin, and "b/a" were determined by calculation.

In the non-aqueous ink-jet ink concerning the present invention, it is preferable that the content of the impurity compounds mixed in the fixing resin of the present invention, i.e., the compound other than the fixing resin which gives the peaks of an integrated value "b" with a proton nuclear magnetic resonance method, is 0.01% or less.

The analysis of the content in the whole non-aqueous ink-jet ink can be done by mixing the fixed amount of the ink with pure water or ion exchanged water and subjected the extracted ingredient in the aqueous phase to well-known methods, such as the above-described proton nuclear magnetic-resonance method, an absorptiometric method, an electro conductivity method and mass spectrometry.

As a method to obtain a fixing resin exhibiting "b/a" of 0.020 or less concerning the present invention, there is no restriction in particular and the resin can be conventionally prepared using any well-known polymerization methods.

As the fixing resins of the present invention, the followings can be cited: an acrylic type resin, a styrene-acrylic type resin, an acrylonitrile-acrylic type resin, a vinyl acetate-acrylic type resin, a polyurethane type resin and a polyester resin. Among them, an acrylic type resin or a vinyl chloride-vinyl acetate copolymer resin is preferably used in the present invention.

An acrylic type resin or a vinyl chloride-vinyl acetate copolymer resin which is preferably used in the present invention can be obtained by synthesizing, for example, with radical addition polymerization.

Radical addition polymerization is a polymerization reaction in which the radical produced from the initiator generates a monomer radical, a polymerization reaction progresses thorough this monomer radical reacting with other monomer molecules, and a resin of a macromolecule (polymer) is produced. For performing this radical addition polymerization, it can be cited roughly the following polymerization methods.

(1) Solution Polymerization

Solution polymerization is a method which performs a polymerization reaction in a solvent capable of dissolving the polymer. As a solvent used in the solution polymerization, it is used a solvent which does not easily react with a monomer and an initiator. In order to obtain a solid polymer, the removal process of a solvent is needed. The production method is listed in U.S. Pat. No. 3,755,271 and JP-A No. 5-320232.

(2) Suspension Polymerization

Suspension polymerization is a polymerization method which produces a suspension while mechanically agitating a monomer and water as a solvent, followed by adding an initiator which is soluble in a monomer but insoluble in water, and then followed by heating and agitating to perform polymerization reaction. In order to stabilize a suspension state, it is common to add a dispersant. Since the polymer particles of a small particle size and having a narrow particle size distribution can be obtained, this polymerization method is also called as bead polymerization, granular polymerization and pearl polymerization. The produced granular polymer can be easily taken out by filtration. The concrete preparation way is listed in JP-A No. 2001-114839, for example.

As other polymerization methods, there are also known polymerization methods such as block polymerization and emulsion polymerization. Although the fixing resins used for the present invention may be prepared by any one of these polymerization methods, it is preferable to prepare the fixing resin prepared by solution polymerization or suspension polymerization.

When the fixing resin concerning the present invention is prepared by suspension polymerization, the dispersant added in order to stabilize a suspension state is presumed to be a material causing degradation factor of the above-described "splash", decap property and glossiness of a picture image, abrasion resistance, and alcohol resistance by remaining as impurities.

Examples of a dispersant used for suspension polymerization include various known water-soluble surfactants such as: polyvinyl alcohol, cellulose derivatives, alkyl or alkyl aryl sulfonate salt, alkyl trialkylammonium halide salt, polyethylene oxide or oxyethylene-oxypropyrene block polymer disclosed in JP-A No. 2001-114839 and sulfosuccinate salt. Among them, as polyethylene oxide or oxyethylene-oxypropyrene block polymer, compounds having a weight average molecular weight in the range of 100,000 to 5,000,000 are suitably used. Examples of a sulfosuccinate salt include: sodium bistridecylsulfosuccinate, sodium dioctylsulfosuccinate, sodium dihexylsulfosuccinate, sodium dicyclohexylsulfosuccinate, sodium diamylsulfosuccinate, sodium diisobutylsulfosuccinate, disodium isodecylsulfosuccinate, disodium sulfosuccinate ethoxylated alcohol half ester, disodium sulfosuccinate ethoxylated nonyl phenol half ester, disodium N-octadecylsulfosuccinate monoamide and sodium diisopropylnaphthalenesulfonate.

The fixing resin prepared in the above-described method can be purified using the conventionally known method in order to eliminate the unreacted monomer, the polymerization initiator, various kinds of additives added during the reaction and other impurities. For example, by washing several times with alcohol or water, the impurities can be removed, then, by drying the washed fixing resin, it can be obtained the fixing resin exhibiting the required b/a value of the present invention.

[Compounds Represented by Formulas (1) and (2)]

Compound (B) represented by the foregoing Formulas (1) and (2) relating to the present invention will now be further detailed.

In the foregoing Formula (1), $R^1$ and $R^2$ are each a substituent having 1 to 6 carbon atoms, for example, a straight or branched chain alkyl group such as a methyl group, an ethyl group, an n-propyl group and an isopropyl group; an alkyl group substituted by a hetero atom such as a hydroxyethyl group, an acetyl group and an acetonyl group; a cyclic group such as a cyclohexyl group and a phenyl group, and an aromatic substituent, and $R^1$ and $R^2$ may be the same or different and may be linked for forming a ring.

In the foregoing Formula (2), $R^3$ and $R^4$ are each a substituent having 1 to 6 carbon atoms, for example, a straight or branched chain alkyl group such as a methyl group, an ethyl group, an n-propyl group and an isopropyl group; an alkyl group substituted by a hetero atom such as a hydroxyethyl group, an acetyl group and an acetonyl group; a cyclic group such as a cyclohexyl group and a phenyl group, and an aromatic substituent, and $R^3$ and $R^4$ may be the same or different and may be linked for forming a ring.

Examples of the compound represented by Formulas (1) or (2) include dimethyl sulfoxide, diethyl sulfoxide, methyl ethyl sulfoxide, diphenyl sulfoxide, tetraethylene sulfoxide, dimethylsulfone, methyl ethyl sulfone, methyl isopropyl sulfone, methyl hydroxyethyl sulfone and sulfolane.

The content of Compound (B) in the ink-jet ink is preferably from 1.5% by mass to 30% by mass, more preferably from 3% by mass to 20% by mass, and still more preferably from 5% by mass to 15% by mass. When the content of Compound (B) is equal to or more than 1.5% by mass, abrasion resistance and resistivity to wiping with alcohol can be obtained to an image formed on polyvinyl chloride because the ink has sufficient solubility to polyvinyl chloride. Further when the content of Compound (A) is 3% by mass or more, good abrasion resistance and resistivity to wiping with alcohol can be achieved. When the content is 30% by mass or less, operational abnormality of the ink-jet head after long term use can be prevented and ejection stability can be achieved.

[Compounds Represented by Formulas (3) and (4)]

The ink-jet ink of the present invention may contain a non-aqueous solvent and preferably contain Solvent (A) constituted by at least one compound selected from the group consisting of compounds the foregoing Formulas (3) and (4).

In the foregoing Formula (3), $R^5$ and $R^6$ each represent a methyl group or an ethyl group and $OX^1$ represents an oxyethylene group or an oxypropylene group.

In the foregoing Formula (4), $R^7$ and $R^8$ each represent a methyl group or an ethyl group; and $OX^2$ represents an oxyethylene group or an oxypropylene group.

Examples of the compounds represented by Formulas (3) and (4) of the present invention include diethylene glycol dimethyl ether, diethylene glycol diethyl ether, dipropylene glycol dimethyl ether, dipropylene glycol diethyl ether, ethyleneglycol diacetate and propyleneglycol diacetate.

Among them, at least one selected from the group of diethylene glycol diethyl ether, dipropylene glycol dimethyl ether, dipropylene glycol diethyl ether, ethyleneglycol diacetate and propyleneglycol diacetate is preferable as the component of Solvent (A), by which the fast drying ability of the image printed on polyvinyl chloride can be further improved. Among them, preferable Solvent (A) contains diethyleneglycol diethylether:ethyleneglycol diacetate at least in the ratio between 1:1 and 10:1.

The content of Solvent (A) in the ink-jet ink is preferably from 50% by mass to 90% by mass. The fast drying ability of image printed on a non-absorbing recording medium such as polyvinyl chloride, polyethylene terephthalate, polyethylene, polypropylene, metal, glass, or ceramic, and the ejection stability is improved and the odor of the ink can be reduced by such solvent constitution.

[Other Solvent]

The ink-jet ink of the present invention may contain a known organic solvent other than Compound (B) and Solvent (A) within the range in which the object of the present invention is not vitiated. Examples of such solvent include: alkyleneglycol monoalkylethers such as diethyleneglycol monoethyl ether, triethyleneglycol monomethyl ether, dipropyleneglycol monomethyl ether and tripropyleneglycol monomethyl ether; alkyleneglycol dialkyl ethers such as ethyleneglycol dibutyl ether and tetraethyleneglycol dimethyl ether; and alkyleneglycol monoalkylether acetate such as ethyleneglycol monobutylether acetate; nitrogen containing heterocycles such as 1,3-dimethyl-2-imidazolidinone and 3-methyl-2-oxazolidinone; and lactones such as γ-butyrolactone and γ-valerolactone.

[Pigment]

The pigment relating to the present invention will be described below.

The weather resistance of the image recorded on the recording medium made from plastics such as polyvinyl chloride can be improved by using a pigment as the colorant of the non-aqueous ink-jet ink of the present invention.

Any known pigments can be used as the pigment to be used in the present invention without any limitation, for example, insoluble pigments, organic pigments such as lake pigments and inorganic pigments such as carbon black are preferably used.

As an insoluble pigment, there is no specific limitation. Preferable examples are: an azo, an azomethine, a methine, a diphenylmethane, a triphenyhnethane, a quinacridone, an anthraquinone, a perylene, an indigo, a quinophthalone, an isoindolinone, an isoindoline, an azine, an oxazine, a thiazin, a dioxazine, a thiazole, a phtlocyanine and diketopyrolopyrrole type pigments are preferred.

As the pigment preferably to be used, for example, the following pigments can be cited.

Examples of a magenta and red pigment include: C.I. Pigment Red 2, C.I. Pigment Red 3, C.I. Pigment Red 5, C.I. Pigment Red 6, C.I. Pigment Red 7, C.I. Pigment Red 12, C.I. Pigment Red 15, C.I. Pigment Red 16, C.I. Pigment Red 48 (Ca), C.I. Pigment Red 48 (Mn), C.I. Pigment Red 48:1, C.I. Pigment Red 53:1, C.I. Pigment Red 57 (Ca), C.I. Pigment Red 57:1, C.I. Pigment Red 112, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 168, C.I. Pigment Red 177, C.I. Pigment Red 178, C.I. Pigment Red 184, C.I. Pigment Red 202, C.I. Pigment Red 209, C.I. Pigment Red 222, C.I. Pigment Red 254 and C.I. Pigment Violet 19.

Examples of an orange or yellow pigment include: C.I. Pigment Orange 32, C.I. Pigment Orange 43, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 120, C.I. Pigment Yellow 128, C.I. Pigment Yellow 129, C.I. Pigment Yellow 130, C.I. Pigment Yellow 138, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, C.I. Pigment Yellow185, C.I. Pigment Yellow 213 and C.I. Pigment Yellow 214.

Examples of a green or cyan pigment include: C.I. Pigment Blue 1, C.I. Pigment Blue 2, C.I. Pigment Blue 3, C.I. Pigment Blue 15, C.I. Pigment Blue 15:2, C.I. Pigment Blue 15:3, C.I. Pigment Blue 15;4, C.I. Pigment Blue 16, C.I. Pigment Blue 22, C.I. Pigment Blue 60 and C.I. Pigment Green 7.

When red, green, blue or intermediate color is required other than the above, the following pigments are preferably used singly or in combination, for example, C.I. Pigment Reds 209, 224, 177 and 194;
C.I. Pigment Orange 43;
C.I. Vat Violet 3;
C.I. Pigment Violets 19, 23 and 37;
C.I. Pigment Green 36 and 7, and
C.I. Pigment Blue 15:6.

As a black pigment, for example, C.I. Pigment Black 1, C.I. Pigment Black 6 and C.I. Pigment Black 7 can be cited.

The content of these pigments in the ink of the present invention is preferably from 2 to 10% by mass. A light colored ink is sometimes used for reducing the granularity of image. In such case, the content of the pigment is preferably reduced by ⅕ to ½.

[Pigment Derivative having an Acid Group]

It is preferable that the non-aqueous ink-jet ink according to the present invention contains a pigment derivative which has been subjected to acidifying treatment.

A pigment derivative having an acid group relating to the present invention refers to a compound in which an acidic functional group is bonded to a mother nucleus having a pigment structure directly or via linking group. Specific examples of an acidic functional group include, for example, a sulfonic acid group, a carboxylic acid group, a phosphoric acid group, a boric acid group and a hydroxyl group. Preferable examples are a sulfonic acid group and a carboxylic acid group, and more preferable example is a sulfonic acid group.

As a method for preparing pigment particles having an acidic functional group on the surface of the particle, for example, disclosed is a method in which a surface of a pigment particle is treated with appropriate oxidant to result in introducing an acid group such as a sulfonic acid or a salt thereof at least in a part on a surface of a pigment. It is disclosed in WO No. 97/48769, JP-A No. 10-110129, JP-A No. 11-246807, JP-A No. 11-57458, JP-A No. 11-18739, JP-A No. 11-323232, and JP-A No. 2000-265094. Specific examples include: a method for preparing by oxidation of carbon black by concentrated nitric acid; and in the case of color pigment, a method for preparing by oxidation by sulfamic acid, sulfonated pyridine salt or amidesulfonic acid in sulfolane or N-methyl-2 pyrrolidone. In these reactions, pigment dispersion can be obtained by eliminating and purifying a compound which become soluble in water due to excess oxidation. Further, in the case of introducing sulfonic acid group by oxidation, an acid group may be neutralized by a basic compound as appropriate.

As other method, cited is a method in which a pigment derivative disclosed in JP-A 11-49974, JP-A 2000-273383, JP-A 2000-303014 each is absorbed on the surface of pigment particles by a treatment such as milling, or a method in which a pigment disclosed in JP-A 2002-179977, JP-A 2002-20141 each is dissolved into a solvent as well as a pigment derivative and followed by a crystallization into a poor solvent. By any method, pigment particles having acidic functional group on the surface can be easily obtained.

According to the present invention, an acidic functional group may be in a state of free or a salt, or having a counter ion. Specific examples of a counter salt include: an inorganic salt such as lithium, sodium, potassium, magnesium, calcium, aluminum, nickel, or ammonium; and an organic salt such as triethyl ammonium, diethyl ammonium, pyridinium, triethanol ammonium, and preferably a counter salt having a mono valence.

Further, a compound represented by the following Formula (5) may be usable as more preferable pigment derivative having an acid group in the present invention.

$$(P-X)^-[N(R_{11},R_{12},R_{13},R_{14})]^+ \qquad \text{Formula (5)}$$

In the above-described Formula (5), P represents a kind of an organic coloring matter selected from the group consisting of azos, benzimidazolones, phthalocyanines, quinacridones, anthraquinones, dioxanes, diketopyrrolopyrroles, quinophthalones, isoindolenones, isoindolins, perylenes, perynones, flavanthrones, pyranthrone, and anthrapyrimidines; X represents a sulfonic acid group or a carboxylic acid group; $R_{11}$ represents an alkyl group having 5 to 20 carbon atoms; $R_{12}$, $R_{13}$, $R_{14}$ each independently represents a hydrogen atom or an alkyl group having 1 to 20 carbon atoms.

The pigment derivative represented by Formula (5) will exhibit preferable increased effects of abrasion resistance and resistivity to wiping with alcohol by making a salt with an amine and a sulfonic acid group or a carboxylic acid group introduced in the pigment derivative. Examples of an amine are: primary amines such as octylamine and dodecylamine; secondary amines such as dioleylamine and distearylamine; tertiary amines such as dimethyllaurylamine and dimethylstearylamine; and quaternary amines such as trimethylammonium and dimethylstearylammonium. Preferable amines are primary amines and quaternary amines.

A content of a pigment derivative having an acid group related to the present invention is preferable 0.2 to 15% by mass based on a total of a pigment and a pigment derivative, more preferably 1 to 10% by mass. When a content of a pigment derivative having an acid group is within the above range, an excellent anti-abrasion property can be achieved.

A pigment included in the non-aqueous ink-jet ink of the present invention and a pigment structure part of a mother nucleus in a pigment derivative are not necessary to have the same structure. However, in view of a final color of a prepared ink, a pigment derivative having a similar color phase with a dispersed pigment such as a yellowish pigment derivative in the case of yellow pigment, a reddish pigment derivative in the case of a red pigment, a bluish pigment derivative in the case of blue pigment, or a colorless pigment derivative is preferable due to have a pigment dispersion having an excellent color phase.

The pigments relating to the present invention are preferably used after dispersed by a dispersing machine together with a pigment derivative having been subjected to an acidifying treatment, a surfactant and an additive necessary for satisfying a designated purpose. As the dispersing machine, known dispersing machines such as a ball mill, a sand mill, an attritor, a roller mill, an agitator, a Henschel mixer, a colloid mill, an ultrasonic homogenizer, a pearl mill, a wet jet mill and a paint shaker are applicable.

The average particle diameter of the pigment dispersion to be used in the ink of the present invention is preferably from 10 nm to 200 nm, and more preferably from 50 nm to 150 nm. The aggregation of the pigment particles can be inhibited by making the average particle diameter to not less than 10 nm and the sedimentation of the pigment during storage for a prolonged period can be easily controlled by making the average particle diameter to be not more than 200 nm. Therefore, the ink having good storage stability easily can be obtained by making the average particle diameter within the above range.

The particle diameter of the pigment dispersion can be measured by a particle diameter measuring apparatus available on the market utilizing a light scattering method, an electrophoretic method or a laser Doppler method. The average particle diameter also can be measured by using a transmission electron microscope. In such case, 100 or more particles are photographed and the resultant images are subjected to statistic treatment by using an image analyzing software such as Image-Pro, manufactured by Mediacybernefics Co., Ltd.

As the pigment dispersant, a surfactant and a polymer dispersant are usable and the polymer dispersant is preferred. Examples of the polymer dispersant include: a (meth)acryl type resin, a styrene-(meth)acryl type resin, a hydroxyl group-containing carboxylic acid ester, a salt of a long chain polyaminoamide and a high molecular weight acid ester, a salt of high molecular weight polycarboxylic acid, a salt of a long chain polyaminoamide and a polar acid ester, a high molecular weight unsaturated acid ester, a modified polyurethane, a modified polyacrylate, a poly ether ester type anionic surfactant, a naphthalene sulfonic acid formalin condensate salt, an aromatic sulfonate formalin condensate salt, a polyoxyethylene alkylphosphate, polyoxyethylene nonylphenyl ether, stearylamine acetate and a pigment derivative.

Concretely, Johncryl manufactured by Johnson Polymer Co., Ltd., Anti-Terra-U manufactured by BYK Chemie Co., Ltd., Disperbyk manufactured by BYK Chemie Co., Ltd., Efka manufactured by Efka Chemicals Co., Ltd., Flowlen manufactured by Kyoei Kagaku Co., Ltd., Disparon manufactured by Kusumoto Kasei Co., Ltd., Ajisper manufactured by Ajinomoto Finetechno Co., Ltd., Demol, Homogenol and Emulgen each manufactured by Kao Co., Ltd., Solsperse manufactured by Avecia Co., Ltd., and Nikkol manufactured by Nikko Chemical Co., Ltd., are cited. Among them, Ajisper PB-821 and PB-822 (condensed compounds made of a polyallylamine and a polyester having a free carboxylic acid; manufactured by Ajinomoto Finetechno Co., Ltd.) are more preferable for the embodiment of the present invention.

The content of dispersant in the ink-jet ink of the present invention is preferably from 10 to 200% by mass based on a pigment. The stability of the pigment dispersion is raised in the range of not less than 10% by mass and the ejection of the ink from the ink-jet head can be easily stabilized by making the content to not more than 200% by mass.

(Condensed Compounds made of a Polyallylamine and a Polyester having a Free Carboxylic Acid)

In the ink of the present invention, it is preferable to contain a Condensed compound made of a polyallylamine and a polyester having a free carboxylic acid.

It is preferable to use polyallylamine derivatives represented by the following Formula [I] as the above-described compound applicable to the present invention.

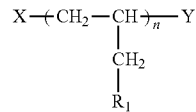

Formula [I]

In the above-described Formula [I], X and Y each independently represent a hydrogen atom, a polymerization initiator residue or a chain transfer catalysis residue, and $R_1$ represents a free amino group, $NH_3^{+-}OCOR_2$, or $NHCOR_2$. $R_2$ represents a residue in which a carboxylic acid group is removed from a polyester having a free carboxylic acid group, a polyamide having a free carboxylic acid group, or a polyester amide having a free carboxylic acid group. "n" is an integer of 2 to 1,000, provided that at least one of $R_1$s represents $NHCOR_2$ among "n" times of $R_1$s.

Subsequently, the details of a polyallylamine derivative represented by Formula [I] concerning the present invention will be described.

The polyallylamine derivative of the present invention can be obtained, for example, by the reaction of a polyallyamine with at least one of three compounds selected from the group of a polyester, a polyamide and a condensed compound of an ester with an amide (polyester amide) each having a free carboxylic acid group.

When it is described in more detail, this polyallylamine derivative can be prepared as follows. For example, it can be prepared by using a polyallylamine having a degree of polymerization of 2 to 1,000, a polyester having a free carboxylic acid group and represented by the following Formulas [II] or [III] and a polyamide having a free carboxylic acid group and represented by the following Formulas [IV] or [V]. These may be used singly, or two or more sorts can be used together and they can be prepared as raw materials.

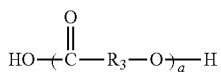

Formula [II]

In the above-described Formula [II], $R_3$ represents a straight or branched alkylene group having 2 to 20 carbon atoms, and "a" represents an integer of 2 to 100.

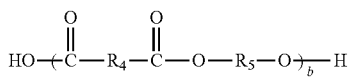

Formula [III]

In the above-described Formula [III], $R_4$ represents a straight or branched alkylene group having 2 to 20 carbon atoms, $C_6H_4$, or CH=CH; $R_5$ represents a straight or branched alkylene group having 2 to 20 carbon atoms, or a residue in which two hydroxyl groups are removed from a polyalkylene glycol; and "b" represents an integer of 2 to 100. It may be contained an ether bond in the aforesaid chains.

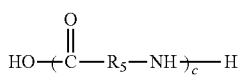

Formula [IV]

In the above-described Formula [IV], $R_5$ represents a straight or branched alkylene group having 2 to 20 carbon atoms, and "c" represents an integer of 2 to 100.

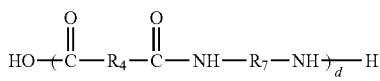

Formula [V]

In the above-described Formula [V], $R_4$ represents a straight or branched alkylene group having 2 to 20 carbon atoms, $C_6H_4$, or CH=CH; $R_7$ represents a straight or branched alkylene group having 2 to 20 carbon atoms; and "d" represents an integer of 2 to 100.

The polyallylamine derivative of the present invention can also be obtained by the reaction of a polyallyamine with a polyester in which the repetition components represented by the foregoing Formula [II] and Formula [III] are randomly polymerized, a polyamide in which the repetition components represented by Formula [IV] and Formula [V] are randomly polymerized, or further a polyesteramide in which the repetition components represented by Formula [II] or Formula [III], and Formula [IV] or Formula [V] are randomly polymerized The polyallylamine used for producing the polyallylamine derivative of the present invention can be obtained by the polymerization reaction of allylamine under the presence of a polymerization initiator, or occasionally under the presence of a chain transfer catalyst.

As the above-described polymerization initiator, there is no special restriction and the polymerization initiator usually used in this field can be used. Examples are: a ketone peroxide derivative such as methyl ethyl ketone; a diacyl peroxide derivative such as benzoyl peroxide; a peroxydicarobonate derivative such as diisopropylperoxy dicarbonate; a hydroperoxide derivative such as t-butylhydroperoxide; a peroxyester derivative such as t-butyl peroxypivalate; in addition, an azobisisobutyronitrile, hydrogen peroxide and ferrous salt. Moreover, the polymerization initiators disclosed in Examined Japanese patent application publication (JP-B) No. 2-14364 may be used.

As the chain transfer catalyst, there can be cited, for example: an alkyl mercaptan such as lauryl mercaptan; a thiocarboxylic acid such as mercaptoacetic acid, 2-mercaptopropionic acid, and 3-mercaptopropionic acid; and a thiocarboxylic acid ester such as butyl thioglycolate and 2-ethylhexyl thioglycolate. However, the present invention is not limited to them.

The number average molecular weight of the polyallylamine used in the present invention is not limited in particular as long as it is 150 to 100,000. But, preferably, it is a polyallylamine having a number average molecular weight of 600 to 20,000.

The reason why the number average molecular weight of the polyallylamine used is the present invention is preferably from 150 to 100,000 is as follows. When the average molecular weight is 150 or more, the adsorption force over a pigment becomes enough and pigment dispersion becomes easy; and when it is 100,000 or less, the generation of aggregation of pigments can be controlled and pigment dispersion becomes easy.

In addition, commercially available polyallylamine can be used. Examples of such polyallylamine are the followings produced by Nitto Boseki Co., Ltd.: PA-1L, PA-1LV, PAA-1.4L, PAA-10C, PAA-15, PAA-15B, PAA-L, PAA-H and PAA-1L-15C.

Moreover, the polyallylamine having an arbitrary molecular weight can be prepared using the method described in JP-B No. 2-14364.

As a polyester used for preparation of the polyallylamine derivative concerning the present invention, the compound represented by the foregoing Formula [II] or Formula [III] is cited. Moreover, in addition to this, there may be used a polyester randomly polymerized with the repetition components of the foregoing Formula [II] and Formula [III].

The polyester represented by the foregoing Formula [II] can be prepared by using a hydroxycarboxylic acid represented by the following Formula [VI], or a lactone represented by the following Formula [VII] as a raw material.

More specifically, it can be prepared by adding a polymerization catalyst into a hydroxy acid, a lactone, or a mixture of a hydroxy acid and a lactone, followed by heating. The reaction temperature is 120 to 220° C., and preferably, it is 160 to 210° C. Moreover, a reaction time is 0.5 to 72 hours. When the reaction is carried out under a nitrogen gas flow, the compound having a large polymerization degree can be obtained. Moreover, control of a reaction will become easy if a polymerization initiator is used at this time. In addition, when lactone is used as a raw material, a monocarboxylic acid can be used as a polymerization initiator in an amount of 0 to 0.5 mol with respect to 1 mol of lactone.

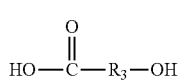

Formula [VI]

Formula [VII]

In the above-described Formula [VI] and Formula [VII], $R_3$ represents a straight or branched alkylene group having 2 to 20 carbon atoms.

Examples of a hydroxycarboxylic acid represented by Formula [VI] include: ricinoleic acid, ricinolenic acid, a mixture of 9-hydroxystearic acid and 10-hydroxystearic acid, 12-hydroxystearic acid, castor oil fatty acid, hydrogenated castor oil fatty acid and lactic acid. Examples of a lactone represented by Formula [VII] include: ε-caprolactone, β-propiolactone, γ-butyrolactone, δ-valerolactone, β-methyl-δ-valerolactone, 4-methylcaprolactone and 2-methylcaprolactone.

Examples of a polymerization catalysis include: quarternary ammonium salts such as tetramethylammonium chloride, tetrabutylammonium chloride, tetramethylammonium bromide, tetrabutylammonium bromide, tetramethylammonium iodide, tetrabutylammonium iodide, benzyltrimethylammonium chloride, benzyltrimethylammonium bromide, benzyltrimethylammonium iodide; quarternary phosphonium salts such as tetramethylphosphonium chloride, tetrabutylphosphonium chloride, tetramethylphosphonium bromide, tetrabutylphosphonium bromide, tetramethylphosphonium iodide, tetrabutylphosphonium iodide, benzyltrimethylphosphonium chloride, benzyltrimethylphosphonium bromide, benzyltrimethylphosphonium iodide, tetraphenylphosphonium chloride, tetraphenylphosphonium bromide, tetraphenylphosphonium iodide; phosphorus compound such as triphenylphosphine; organic carboxylic acid salts such as potassium acetate, sodium acetate, potassium benzoate, and sodium benzoate; alkali metal alcolates such as sodium alcolate and potassium alcolate; tertiary amine compound; organic tin compound, organic aluminium compound, organic titanate compound; and zinc compounds such as zinc chloride.

Examples of a polymerization initiator include: aliphatic monocarboxylic acids such as acetic acid, propionic acid, caprylic acid, nonanoic acid, capric acid, octylic acid, lauric acid, myristic acid, palmitic acid, stearic acid, isononanoic acid and arachic acid; and aromatic monocarboxylic acids such as benzoic acid and p-butylbenzoic acid.

A polyester represented by Formula [III] can be prepared by the reaction of a diol represented by HO—$R_5$—OH with a dibasic acid represented by HO—CO—$R_4$—COOH.

In the Formula, $R_4$ represents a straight or branched alkylene group having 2 to 20 carbon atoms, $C_6H_4$, or CH═CH; $R_7$ represents a straight or branched alkylene group having 2 to 20 carbon atoms; and $R_5$ represents a straight or branched alkylene group having 2 to 20 carbon atoms, or a residue in which two hydroxyl groups are removed from a polyalkylene glycol.

More specifically, it can be prepared by adding a polymerization catalyst into an equimolar mixture of the above-described diol and dibasic acid, followed by heating. It is preferable that a small excessive amount of dibasic acid is added at this time. The reaction temperature is 120 to 220° C., and preferably, it is 160 to 210° C. Moreover, a reaction time is 0.5 to 72 hours. When the reaction is carried out under a nitrogen gas flow, the compound having a large polymerization degree can be obtained. Moreover, it is preferable to use a polymerization initiator at this time because it can easily control of the reaction.

Examples of the above-described diol include: alkylene glycols such as ethylene glycol, propylene glycol, neo pentyl glycol, 1,3-butanediol, 1,4-butanediol and 1,6-hexanediol; ether containing diols such as diethylene glycol, dipropylene glycol and Methylene glycol. Examples of the dibasic acid include: dibasic acids containing an unsaturated bond such as maleic anhydride and a fumaric acid; aromatic dibasic acids such as phthalic anhydride and terephthalic acid; and saturated dibasic acids such as adipic acid and sebacic acid.

The polymerization catalyst and the polymerization initiator used in the reaction may be the same as used in the production of the polyester represented by the foregoing Formula [II].

A polyester produced by randomly polymerizing the foregoing repeating components represented by the foregoing Formula [II] and Formula [III] can be prepared by adding a polymerization catalysis into a hydroxycarboxylic acid, a lactone, or a mixture of a hydroxy acid and a lactone, or an equimolar mixture of the aforesaid diol and dibasic acid, followed by heating. The reaction conditions are the same as used for preparation of the foregoing Formula [II].

Moreover, a polyester in which the repeating components represented by Formula [II] and Formula [III] are polymerized in the state of a block polymer can be obtained by preparing in advance polyesters of Formula [II] and Formula [III], respectively, and then allowing to carry out dehydration condensation.

Although the molecular weight of the polyester used in the present invention is sufficient as long as it is in the range of 300 to 20,000, from the point of the dispersion performance of a pigment, the molecular weight of 1,000 to 10,000 is preferable. When the molecular weight is 300 or more, the side chain length of the dispersant becomes long enough, and a good dispersion effect can be acquired. On the other hand, when the molecular weight is 20,000 or more, the side chain length of the dispersant will not be extremely long, as a result, the aggregation of pigments can be prevented and decrease of fluidity can be inhibited. In order to obtain the polyester having such molecular weight, it becomes possible by the following ways: to set up the molar ratio of the polymerization initiator to the hydroxy acid, the lactone, the diol, the dibasic acid used as raw materials; and to set up a suitable reaction time by observing the acid number of an intermediate reaction product during the course oft the reaction.

As a polyamide used for preparation of the polyallylamine derivative concerning the present invention, the compound represented by the foregoing Formula [IV] or Formula [V] is cited. Moreover, in addition to this, it may be used a compound in which the repeating components of Formula [IV] and Formula [V] are randomly polymerized.

The polyamide represented by the foregoing Formula [IV] can be prepared by using a lactam represented by the following Formula [VIII] and an aminocarboxylic acid represented by $H_2N$—$R_6$—COOH as raw materials. Here, $R_6$ represents a straight or branched alkylene group having 2 to 20 carbon atoms.

Formula [VIII]

More specifically, it can be prepared by heating a lactam represented by Formula [VIII] and an aminocarboxylic acid represented by $H_2N$—$R_6$—COOH or a mixture of a lactam and an aminocarboxylic acid. The condensation reaction is preferably carried out under a nitrogen gas flow. The reaction temperature is 150 to 210° C. When it is 250° C. or less, coloring can be prevented, and when it is 110° C. or more, a sufficient reaction rate can be obtained. The reaction time is 0.5 to 72 hrs. Moreover, control of the reaction will become easy if a polymerization initiator is used at this time. Furthermore, the reaction time can be shortened by adding a polymerization catalyst. Molecular weight can be measured by oxidation. In addition, when a lactam is used as a raw material, 0 to 0.5 mol of the monocarboxylic acid can be used as a polymerization initiator with respect to 1 mol of lactam.

As the above-described lactam, there can be cited ε-caprolactam and ω-laurolactam. As an aminocarboxylic acid, there can be cited aminocaproic acid and 11-aminoundecanoic acid. Moreover, as the polymerization catalyst or the polymerization initiator, the same polymerization catalyst or polymerization initiator used for the production of an polyester can be used.

The polyamide represented by Formula [V] can be prepared by using a dibasic acid represented by the foregoing Formula HO—CO—$R_4$—COOH and $H_2N$—$R_7$—$NH_2$ ($R_7$ represents a straight or branched alkylene group having 2 to 20 carbon atoms) as raw materials. The dibasic acid used here is the same as used for preparation of the aforesaid polyester, and examples of the diamine include: ethylenediamine, 1,4-diaminobutane and hexamethylenediamine.

The reaction conditions in production of a polyamide represented by Formula [V] are the same as the manufacturing conditions of a polyamide represented by the above-described Formula [IV].

A polyester produced by randomly polymerizing the repeating components represented by Formula [IV] and Formula [V] can be prepared by using a lactam, an aminocarboxylic acid, a dibasic acid and a diamine used for producing the aforesaid Formula [IV] and Formula [V], and by applying the polymerization conditions of the polyamide as described above.

A condensed compound (polyester amide) of an ester and an amide used for preparing a polyallylamine derivative of the present invention can be produced as follows: to select at least one of hydroxycarboxylic acid, lactone, dibasic acid and died which are used for the production of the aforesaid polyester and polyamide; to select one of aminocarboxylic acid, lactam, dibasic acid and diamine; and to apply the polymerization conditions used for the aforesaid polyamide.

Moreover, it can be prepare by carrying out preliminary condensation of the polyester and the polyamide which are obtained by the above-described preparation ways, and by further carrying out condensation of these. The polymerization conditions are the same as described above, and the reaction can be terminated with the target degree of polymerization by observing the acid number of a reaction product.

The reaction of polyallylamine and the polymer introduced into a side chain is explained in detail below. To 1 mol of polyallylamine having n pieces of amino groups are mixed at least one selected from the group of a polyester, a polyamide and a condensed compound of eater and amide (polyester amide) having a free carboxylic acid in an amount of total 1 mole or more, preferably in an amount of from 2 mols to 2 n mols from the viewpoint of pigment dispersibility, and they are allowed to react. It may be possible to perform reaction using different kinds of polyesters, polyamides or condensed compounds of ester and amide (polyester amide). It may be possible to use a polymerization catalyst in the reaction, and the same polymerization catalyst used in the production of polyester can be used. Moreover, it does not matter at all to use solvents such as xylene and toluene in the reaction.

In this case, the reaction between a polyallylamine and a polyester, a polyamide or a condensed compound of eater and amide (polyester amide) having a free carboxylic acid is a salt formation or an acid amide bond forming reaction between a free amine in the former compound and a free carboxylic acid in the latter compound. Moreover, when a polyester or a polyester amide is used, the ester group of these and an amino group in the side chain of polyallylamine will make a transamidation at the same time according to the reaction conditions and the type of the polyester and the polyester amide used. In this reaction, it depends on reaction conditions whether a salt is formed or an acid amide bond is formed.

An acid amide bond forming reaction and a salt forming reaction will occur simultaneously. The acid amide bond forming reaction is performed at 90 to 210° C., and more preferably at 100 to 210° C. Coloring will be produced to the reaction product when it is 250° C. or more, and the reaction time will become long when it is 90° C. or less. Moreover, when the reaction is performed under a nitrogen gas flow, the reaction product having little coloring will be obtained.

On the other hand, as a reaction temperature at which a salt forming reaction is performed, 20 to 140° C. is preferable.

A polyallylamine derivative according to the present invention is preferably a compound produced by an acid amide forming reaction between a polyallylamine having an n pieces of amino groups with a terminal carboxylic group in a polyester, a polyamind, or a condensed compound of an ester and amide in an amount of 2 mols or more from the viewpoint of pigment dispersibility. Especially preferred is a compound in which among n pieces of $R_1$s in the aforesaid Formula [I], the residue having the form of an acid amide bond represented by $NHCOR_2$ is existed in the range of 60 to 95%. More preferred is a compound in which the residue having the form of an acid amide bond is existed in the range of 65 to 90%.

When an amount of less than 60% of amino groups contained in the polyallylamine forms a covalent bond through an amide bond, the aggregation of pigments will occur to result in insufficient viscosity decreasing effect or to produce a failure of coating film appearance, and it cannot be used as a dispersant. While, when an amount of more than 96% of amino groups contained in the polyallylamine forms a covalent bond through an amide bond, the amount of the functional groups to which the pigments adsorbed will be insufficient to result in difficulty to contribute to pigment dispersion. This will cause insufficient viscosity decreasing effect or will produce a failure of coating film appearance, and it cannot be used as a dispersant.

In a polyallylamine derivative according to the present invention, in order to combine the amino groups in the polyallylamine through a covalent bond in the above-described range, it can be determined by measuring amine value A immediately after mixing the polyallylamine with at least one of the group of polyester, polyamide and condensation compound of an ester and an amide (polyester amide) which have a carboxylic group at one terminal position, and amine value B after termination of a reaction, and by calculating these changes with the following Scheme 1.

Ratio of covalent bond of amino groups in polyallylamine derivative={(Amine value $A$−Amine value $B$)/Amine value $A$}×100      Scheme 1

Although amine value immediately after mixing may be measured actually, since the reaction is not advancing immediately after mixing, the amine value of the polyallylamine used as a raw material is also calculable from the mass of the polymer and polyallylamine which were used for the reaction. In addition, even if the amino group of polyallylamine and the carboxyl group of the polymer introduced into a side chain form a salt, the amine value obtained is not influenced at all.

In a polyallylamine derivative according to the present invention, the properties will be improved when the mass ratio of the polyallylamine to the polyester, the polyamide, or the condensation compound of ester and amide (polyester amide) having a carboxylic acid group at one terminal is in the range of 1/5 to 1/30; and the amine value of the prepared polyallylamine derivative is in the range of 5 to 30 (mgKOH/g). When the amine value is 5 or more, sufficient adsorption force over a pigment will be acquired to result in good pigment dispersion, and when it is 30 or less, the generation of aggregation of pigment can be prevented.

The acid number (mgKOH/g) of the polyallylamine derivative concerning the present invention is preferably 2.5 to 50 from the viewpoint of pigment dispersion.

The molecular weight of the polyallylamine derivative concerning the present invention obtained by the above-described reaction is preferably 2,000 to 100,000 when it is used as a pigment dispersant.

In addition, the polyallylamine derivative concerning the present invention can also be prepared by applying the above-described polymerization conditions for polyester formation to polyallylamine directly with at least one of the followings: hydroxycarboxylic acid, lactone, dibasic acid and diol, aminocarboxylic acid, lactam, and dibasic acid with diamine.

The polyallylamine derivative represented with Formula [I] concerning the present invention is preferably added in the range of 10% by mass to 200% by mass with respect to the pigment.

[Other Additives]

In the ink-jet ink of the present invention, various kinds of known additive such as a viscosity controlling agent, a relative resistivity controlling agent, a film forming agent, a UV absorbent, an antioxidant, an anti-color fading agent, an anti-mold agent, a rust preventive and a stabilizing agent may be added in addition to the aforesaid materials corresponding to the purposes of improving various properties of the ink such as the ejection stability, suitability for the print head or the ink cartridge, storage stability, an image storage stability and other performances.

[Ink-Jet Recording Method]

The ink-jet head to be used on the occasion of image formation by ejecting the non-aqueous ink-jet ink of the present invention may be either an on-demand type or a continuous type. The ejection system may be any of an electro-mechanical conversion system such as a single cavity type, a double cavity type, a bender type, a piston type, a share mode type and a shared wall type, and an electro-thermal conversion system such as a thermal ink-jet type and Bubble Jet™ type.

In the ink-jet recording method using the non-aqueous ink-jet ink of the present invention, an ink-jet recorded image can be obtained by ejecting the ink from the ink-jet head according to digital signals and adhering onto the recording medium using, for example, a printer in which the ink is charged. The image formation while raising the surface temperature of the image recording medium is preferable for fast and surely drying the ink adhering on the recording medium.

The surface temperature is preferably from 40 to 100° C. though the temperature is controlled corresponding to the durability of the recording medium or the drying ability of the ink. Particularly, it is more preferable that the recording is carried out while raising the surface temperature because the wetting ability of the ink with the recording medium surface is improved when polyvinyl chloride is used as the recording medium.

The wetting ability and the drying ability of the ink are varied sometimes depending on the kind of the polyvinyl chloride. Therefore, the surface temperature may be controlled according to the properties of the recording medium.

When the recording is carried out while the surface temperature of the recording medium is raised, a heater is preferably installed in the ink-jet recording apparatus. The surface temperature of the recording medium can be controlled by only the ink-jet recording apparatus by heating the recording medium before or during transportation of the recording medium by the installed heater.

[Recording Medium]

According to the present invention, it is characterized by using the recording medium comprising one selected from the group consisting of a polyvinyl chloride, a resin substrate without a plasticizer and a non-absorbing inorganic substrate as a constituent of recording medium for forming an image thereon by using the non-aqueous ink-jet ink of the present invention.

The recording medium to be used in the ink-jet recording method of the present invention is preferably one made from polyvinyl chloride. Concrete examples of the recording medium composed of polyvinyl chloride include: SOL-371G, SOL-373M and SOL-4701 each manufactured by Bigtechnos Co., Ltd., Glossy Vinyl Chloride manufactured by Systemgraphy Co., Ltd., KSM-VS, KSM-VST and KSM-VT each manufactured by Kimoto Co., Ltd., J-CAL-HGX, J-CAL-YHG and J-CAL-WWWG each manufactured by Kyosho Osaka Co., Ltd., BUS MARK V400 F vinyl and LITECcal V-600 vinyl each manufactured by Flexcon Co., Ltd., FR2 manufactured by Hanwah Co., Ltd., LLBAU13713 and LLSP20133 each manufactured by Sakurai Co., Ltd., P-370B and P-400M each manufactured by Kanbo Pras Co., Ltd., S02P, S13P, S14P, S22P, S24P, S34P and S27P each manufactured by Grafityp Co., Ltd., P-223RW, P-224RW and P-284ZC each manufactured by Lintec Co., Ltd., LKG-19, LPA-70, LPE-248, LPM-45, LTG-11 and LTG-21 each manufactured by Shinseisha Co., Ltd., MP13023 manufactured by Toyo Corporation Co., Ltd., Napoleon Gloss glossy vinyl chloride manufactured by Niki Electronics Co., Ltd., JV-610 and Y-114 each manufactured by IKC Co., Ltd., NIJ-CAPVC and NIJ-SPVCGT each manufactured by Nichie Co., Ltd., 3101/H12/P4, 3104/H12/P4, 3104/H12/P4S, 9800/H12/P4, 3100/H12/R2, 3101/H12/R2, 3104/H12/R2, 1445/H14/P3 and 1438/One Way Vision each manufactured by Inetrocoat Co., Ltd., JT5129PM, JT5128P, JT5822P, JT5829P, JT5829R, JT5829PM, JT5829RM and JT5929PM each manufactured by Mactac Co., Ltd., MPI11005, MPI1900, MPI2000, MPI2001, MPI2002, MPI3000, MPI3021, MPI3500 and MPI3501 each manufactured by Avery Co., Ltd., MA-101G and MA-501 G each manufactured by Gin'ich Co., Ltd., FR2 manufactured by Hanfa Japan Co., Ltd., AY-15P, AY-60P, AY-80P, DBSP137GGH and DBSP137GGL each manufactured by Insite Co., Ltd., SJT-V200F and SJT-V400F-1 each manufactured by Hiraoka Shokusen Co., Ltd., SPS-98, SPSM-98, SPSH-98, SVGL-137, SVGS-137, MD3-200, MD3-301M, MD5-100, MD5-101M and MD%-105 each manufactured by Metamark Co., Ltd., 640M, 641G, 641M, 3105M, 3105SG, 3162G, 3164G, 3164M, 3164XG, 3164XM, 3165G, 3165SG, 3165M, 3451SG, 3551G, 3551M, 3631, 3141M, 3651G, 3651M, 3651SG, 3951G and 3641M each manufactured by Orafol Co., Ltd., SVTL-HQ130 manufactured by Lami Corporation Co., Ltd., SP300 GWF and SPECLEAD vinyl each manufactured by Catalina Co., Ltd., RM-SJR manufactured by Ryoyo Shoji Co., Ltd., Hi Lucky and New Lucky PVC manufactured by LG Co., Ltd., SIY-110, SW-310 and SW-320 each manufactured by Sekisui Co., Ltd., PRINT MI Frontlit and PRINT XL Light weight banner each manufactured by Endutex Co., Ltd., RILET 100, RIJET 145 and RIJET 165 each manufactured by Ritrama Co., Ltd., NM-SG and NM-SM each manufactured by Nichiei Kako Co., Ltd., LTO3SG manufactured by Lukio Co., Ltd., Easy Print 80 and Performance Print 80 each manufactured by Jetgraph Co., Ltd., DSE 550, DSB550, DSE 800G, DSE 802/137, V250WG, V300WG and V350WG each manufactured by Hexis Co., Ltd., and Digital White 6005PE and 6010PE each manufactured by Multifix Co., Ltd.

As a recording medium having a constituent element of a resin substrate without containing a plasticizer or a non-absorbing inorganic substrate, a various substrate below is usable as a constituent element in alone or in combination with a plural kinds of substrate. Specific example of a resin substrate without containing a plasticizer include: ABS resin, polycarbonate resin (PC), polyacetal resin (POM), polyamide resin (PA), polyethylene terephthalate resin (PET), polyimide resin (PI), acryl resin, polyethylene resin (PE), polypropylene resin (PP), and hard polyvinyl chloride resin (PVC) without containing a plasticizer.

These resins are characterized by containing no plasticizer and other characteristic such as thickness, shape, color, softening temperature, or hardness is not particularly limited.

Preferred recording mediums used in the present invention are: ABS resin, PET resin, PC resin, POM resin, PA resin, PI resin, hard PVC resin without containing a plasticizer, acryl resin, PE resin and PP resin, more preferably ABS resin, PET resin, PC resin, PA resin, hard PVC resin without containing a plasticizer, and acryl resin.

Specific examples of a non-absorbing inorganic substrate include: a glass plate, a metal plate such as iron or aluminum, and a ceramic plate. These inorganic substrate are characterized by a surface withoiut an ink absorbing layer and other characteristic such as thickness, shape, color, softening temperature, or hardness is not particularly limited.

EXAMPLES

The present invention is concretely described referring examples below though the present invention is not limited to them. In the examples, "part" and "%" are each "part by mass" and "% by mass", respectively, as long as any specific comment is not attached.

<<Preparation of Fixing Resin>>

[Preparation of Resin (1) Group: a Vinyl Chloride-Vinyl Acetate Copolymer Resin by a Suspension Polymerization Method]

In the same manner as described in JP-A No. 2001-114839, a vinyl chloride-vinyl acetate copolymer resin was synthesized by a suspension polymerization method. This resin was a vinyl chloride-vinyl acetate copolymer resin containing 85% of a vinyl chloride unit and 15% of a vinyl acetate unit, and having the number average molecular weight of 27,000. After termination of the polymerization reaction, the prepared resin was taken out as a resin slurry by filtration, followed by washing with methanol. The washing frequency and the washing time with methanol, and subsequent washing frequency and the washing time with deionized water were adjusted suitably, and fixing resins 1a to 1e each having the b/a value as listed in Table 1 were prepared.

[Preparation of Resin (2) Group: a Vinyl Chloride-Vinyl Acetate Copolymer Resin by a Suspension Polymerization Method]

In preparation of the above-described resin (1) group, with keeping the same conditions except having suitably adjusted the reaction temperature and the reaction time, a vinyl chloride-vinyl acetate copolymer resin (2) was synthesized by the suspension polymerization method. This resin was a vinyl chloride-vinyl acetate copolymer resin containing 85% of a vinyl chloride unit and 15% of a vinyl acetate unit, and having the number average molecular weight of 19,000. This resin was subjected to the same washing as done to Resin (1) group. Fixing resins 2a to 2d each having the b/a value as listed in Table 2 were prepared.

[Preparation of Resin (3) Group: a Vinyl Chloride-Vinyl Acetate Copolymer Resin by a Solution Polymerization Method]

In the same manner as described in JP-A No. 5-320232, a vinyl chloride-vinyl acetate copolymer resin was synthesized by a solution polymerization method. This resin was a vinyl chloride-vinyl acetate copolymer resin containing 85% of a vinyl chloride unit and 15% of a vinyl acetate unit, and having the number average molecular weight of 19,000. After termination of the polymerization reaction, the prepared resin was precipitated with a mixture of isopropanol and water, then, a resin slurry was taken out by filtration, followed by washing with methanol. The washing frequency and the washing time with methanol, and subsequent washing frequency and the washing time with deionized water were adjusted suitably, and fixing resins 3a and 3b each having the b/a value as listed in Table 2 were prepared.

[Preparation of Resin (4) Group: an Acrylic Resin by a Suspension Polymerization Method]

In the same manner as preparation of the above-described resin (1) group, and by having suitably adjusted the reaction temperature and the reaction time, an acrylic resin was prepared by a suspension polymerization method. This resin was an acrylic resin (a butyl methacrylate-methyl methacrylate copolymer resin) containing 10% of a butyl methacrylate unit and 90% of a methyl methacrylate unit, and having the number average molecular weight of 19,000. This resin was subjected to the same washing as done to resin (1) group. The washing frequency and the washing time with methanol, and subsequent washing frequency and the washing time with deionized water were adjusted suitably, and fixing resins 4a to 4d each having the b/a value as listed in Table 2 were prepared.

[Preparation of Resin (5) Group: an Acrylic Resin by a Solution Polymerization Method]

In the same manner as preparation of the above-described resin (3) group, and by having suitably adjusted the reaction temperature and the reaction time, an acrylic resin was prepared by a solution polymerization method. This resin was an acrylic resin (a butyl methacrylate-methyl methacrylate copolymer resin) containing 10% of a butyl methacrylate unit and 90% of a methyl methacrylate unit, and having the number average molecular weight of 19,000. This resin was subjected to the same washing as done to resin (3) group. The washing frequency and the washing time with methanol, and subsequent washing frequency and the washing time with deionized water were adjusted suitably, and fixing resins 5a to 5c each having the b/a value as listed in Table 2 were prepared.

<<Preparation of Ink>>

[Preparation of Ink 1]

<Preparation of Pigment Dispersion 1>

Nine parts of C.I. Pigment Blue 15:3 (hereinafter abbreviated to as PB 15:3), 1 part of SOLSPERES 5000 (cupper phthalocyanine pigment derivative having a sulfonic acid group, made by Lubrizol Corporation), 5 parts of Ajisper PB-822 (condensed compound made of a polyallylamine and a polyester having a free carboxylic acid; manufactured by Ajinomoto Finetechno Co., Ltd.), 10 parts of dimethyl sulfoxide (S-1) as Compound (B) and 75 parts of diethylene glycol diethyl ether as Solvent (A) were mixed and dispersed by a horizontal type beads mill (System Zeta mini, manufactured by Ashizawa Ltd.) together with 60% by volume of zirconia beads having a diameter of 0.5 mm. Pigment Dispersion 1 was obtained after the zirconia beads were removed.

<Preparation of Resin Solution 1>

Ten parts of dimethyl sulfoxide as Compound (B), 80 parts of diethylene glycol diethyl ether as Solvent (A) and 10 parts of vinyl chloride-vinyl acetate copolymer synthesized by a suspension polymerization method having a b/a value of 0 were mixed and dissolved. Thus, Resin Solution 1 was prepared.

<Preparation of Ink>

Fifty parts of Pigment Dispersion 1 was mixed with 50 parts of the above Resin Solution 1 while stirring and filtered through a filter of 0.8 μm. Thus Ink 1 was obtained.

[Preparation of Inks 2 to 42]

Inks 2 to 39 were prepared in the same manner as in Ink 1 except that the kind of pigment, the kind of fixing resin, the kind and the adding amount of Solvent (A), and the kind and the adding amount of other solvent were changed as described in Tables 1 and 2.

TABLE 1

| Ink No. | Pigment Kind | Pigment Content 4.5% | Pigment derivative Content | Dispersant Content | Fixing resin Resin | b/a | Content tent | Content of Component b | Compound (B) Kind | Content tent | Solvent (A) Solvent 1 Kind | Content tent | Solvent 2 Kind | Content tent | Other solvent Solvent 1 Kind | Content tent | Remarks |
|---|---|---|---|---|---|---|---|---|---|---|---|---|---|---|---|---|---|
| 1 | PB15:3 | 0.5 | 2.5 | (1a) | 0 | 5 | 0 | S-1 | 10 | DEGDEE | 77.5 | — | — | — | — | Inv. |
| 2 | PB15:3 | 0.5 | 2.5 | (1b) | 0.006 | 5 | 0.030 | S-1 | 10 | DEGDEE | 77.5 | — | — | — | — | Inv. |
| 3 | PB15:3 | 0.5 | 2.5 | (1c) | 0.018 | 5 | 0.090 | S-1 | 10 | DEGDEE | 77.5 | — | — | — | — | Inv. |
| 4 | PB15:3 | 0.5 | 2.5 | (1d) | 0.032 | 5 | 0.160 | S-1 | 10 | DEGDEE | 77.5 | — | — | — | — | Comp. |
| 5 | PB15:3 | 0.5 | 2.5 | (1e) | 0.051 | 5 | 0.255 | S-1 | 10 | DEGDEE | 77.5 | — | — | — | — | Comp. |
| 6 | PB15:3 | 0.5 | 2.5 | (2a) | 0 | 5 | 0 | S-1 | 10 | DEGDEE | 77.5 | — | — | — | — | Inv. |
| 7 | PB15:3 | 0.5 | 2.5 | (2b) | 0.005 | 5 | 0.025 | S-1 | 10 | DEGDEE | 77.5 | — | — | — | — | Inv. |
| 8 | PY150 | 0.5 | 2.5 | (2b) | 0.005 | 5 | 0.025 | S-1 | 10 | DEGDEE | 77.5 | — | — | — | — | Inv. |
| 9 | PR122 | 0.5 | 2.5 | (2b) | 0.005 | 5 | 0.025 | S-1 | 10 | DEGDEE | 77.5 | — | — | — | — | Inv. |
| 10 | CB | 0.5 | 2.5 | (2b) | 0.005 | 5 | 0.025 | S-1 | 10 | DEGDEE | 77.5 | — | — | — | — | Inv. |
| 11 | PB15:3 | 0.5 | 2.5 | (2b) | 0.005 | 5 | 0.025 | S-2 | 10 | DEGDEE | 77.5 | — | — | — | — | Inv. |
| 12 | PB15:3 | 0.5 | 2.5 | (2b) | 0.005 | 5 | 0.025 | S-3 | 10 | DEGDEE | 77.5 | — | — | — | — | Inv. |
| 13 | PB15:3 | 0.5 | 2.5 | (2b) | 0.005 | 5 | 0.025 | S-4 | 10 | DEGDEE | 77.5 | — | — | — | — | Inv. |
| 14 | PB15:3 | 0.5 | 2.5 | (2b) | 0.005 | 5 | 0.025 | S-5 | 10 | DEGDEE | 77.5 | — | — | — | — | Inv. |
| 15 | PB15:3 | 0.5 | 2.5 | (2b) | 0.005 | 5 | 0.025 | S-6 | 10 | DEGDEE | 77.5 | — | — | — | — | Inv. |
| 16 | PB15:3 | 0.5 | 2.5 | (2b) | 0.005 | 5 | 0.025 | S-7 | 10 | DEGDEE | 77.5 | — | — | — | — | Inv. |
| 17 | PB15:3 | 0.5 | 2.5 | (2b) | 0.005 | 5 | 0.025 | S-8 | 10 | DEGDEE | 77.5 | — | — | — | — | Inv. |
| 18 | PB15:3 | 0.5 | 2.5 | (2b) | 0.005 | 5 | 0.025 | S-9 | 10 | DEGDEE | 77.5 | — | — | — | — | Inv. |
| 19 | PB15:3 | 0.5 | 2.5 | (2b) | 0.005 | 5 | 0.025 | S-10 | 10 | DEGDEE | 77.5 | — | — | — | — | Inv. |
| 20 | PB15:3 | 0.5 | 2.5 | (2b) | 0.005 | 5 | 0.025 | S-1 | 3 | DEGDEE | 84.5 | — | — | — | — | Inv. |
| 21 | PB15:3 | 0.5 | 2.5 | (2b) | 0.005 | 5 | 0.025 | S-1 | 5 | DEGDEE | 82.5 | — | — | — | — | Inv. |

Inv.: Invention,
Comp.: Comparison

TABLE 2

| Ink No. | Pigment Kind | Pigment Content 4.5% | *1 Content | Dispersant Content | Fixing resin Resin | b/a | Content tent | *2 | Compound (B) Kind | Content | Solvent (A) Solvent 1 Kind | Content tent | Solvent 2 Kind | Content tent | Other solvent Solvent 1 Kind | Content tent | Remarks |
|---|---|---|---|---|---|---|---|---|---|---|---|---|---|---|---|---|---|
| 22 | PB15:3 | 0.5 | 2.5 | (2b) | 0.005 | 5 | 0.025 | S-1 | 15 | DEGDEE | 72.5 | — | — | — | — | Inv. |
| 23 | PB15:3 | 0.5 | 2.5 | (2b) | 0.005 | 5 | 0.025 | S-1 | 30 | DEGDEE | 50.0 | — | TEGDME | 7.5 | Inv. |
| 24 | PB15:3 | 0.5 | 2.5 | (2b) | 0.005 | 5 | 0.025 | S-1 | 10 | DEGDME | 77.5 | — | — | — | — | Inv. |
| 25 | PB15:3 | 0.5 | 2.5 | (2b) | 0.005 | 5 | 0.025 | S-1 | 10 | DPGDEE | 77.5 | — | — | — | — | Inv. |
| 26 | PB15:3 | 0.5 | 2.5 | (2b) | 0.005 | 5 | 0.025 | S-1 | 10 | DPGDME | 77.5 | — | — | — | — | Inv. |
| 27 | PB15:3 | 0.5 | 2.5 | (2b) | 0.005 | 5 | 0.025 | S-1 | 10 | DEGDEE | 67.5 | PGDAc | 10 | — | — | Inv. |
| 28 | PB15:3 | 0.5 | 2.5 | (2b) | 0.005 | 5 | 0.025 | S-1 | 10 | DEGDEE | 67.5 | EGDAc | 10 | — | — | Inv. |
| 29 | PB15:3 | 0.5 | 2.5 | (2b) | 0.005 | 5 | 0.025 | S-1 | 5 | DEGDEE | 77.5 | — | — | DMI | 5.0 | Inv. |
| 30 | PB15:3 | 0.5 | 2.5 | (2b) | 0.005 | 5 | 0.025 | S-1 | 5 | DEGDEE | 77.5 | — | — | MOZ | 5.0 | Inv. |
| 31 | PB15:3 | 0.5 | 2.5 | (2b) | 0.005 | 5 | 0.025 | S-1 | 10 | DEGDEE | 50.0 | — | — | EGBEAc | 37.5 | Inv. |
| 32 | PB15:3 | 0.5 | 2.5 | (2c) | 0.012 | 5 | 0.060 | S-1 | 10 | DEGDEE | 77.5 | — | — | — | — | Inv. |
| 33 | PB15:3 | 0.5 | 2.5 | (2d) | 0.024 | 5 | 0.120 | S-1 | 10 | DEGDEE | 77.5 | — | — | — | — | Comp. |
| 34 | PB15:3 | 0.5 | 2.5 | (3a) | 0 | 5 | 0 | S-1 | 10 | DEGDEE | 67.5 | — | — | TEGDME | 10.0 | Inv. |
| 35 | PB15:3 | 0.5 | 2.5 | (4a) | 0 | 5 | 0 | S-1 | 10 | DEGDEE | 67.5 | — | — | TEGDME | 10.0 | Inv. |
| 36 | PB15:3 | 0.5 | 2.5 | (4b) | 0.004 | 5 | 0.020 | S-1 | 10 | DEGDEE | 67.5 | — | — | TEGDME | 10.0 | Inv. |
| 37 | PB15:3 | 0.5 | 2.5 | (4c) | 0.017 | 5 | 0.085 | S-1 | 10 | DEGDEE | 67.5 | — | — | TEGDME | 10.0 | Inv. |
| 38 | PB15:3 | 0.5 | 2.5 | (4d) | 0.027 | 5 | 0.135 | S-1 | 10 | DEGDEE | 67.5 | — | — | TEGDME | 10.0 | Comp. |
| 39 | PB15:3 | 0.5 | 2.5 | (5a) | 0 | 5 | 0 | S-1 | 10 | DEGDEE | 67.5 | — | — | TEGDME | 10.0 | Inv. |

*1: Pigment derivative,
*2: Content of Component b,
Inv.: Invention,
Comp.: Comparison Details of the additives described in abbreviations in Tables 1 and 2 are as follows. The numerical values of the content in Tables 1 and 2 are % by mass.

[Pigment]
  PB15:3: C.I. Pigment Blue 15:3
  PY150: C.I. Pigment Yellow 150
  PR122: C.I. Pigment Red 122
  CB: Carbon black

[Compound (B)]
  S-1: Dimethyl sulfoxide
  S-2: Di-n-propyl sulfoxide
  S-3: Di-n-butyl sulfoxide
  S-4: Diphenyl sulfoxide
  S-5: Tetramethylene sulfoxide
  S-6: Dimethyl sulfone
  S-7: Di-n-propyl sulfone
  S-8: Methyl isopropyl sulfone
  S-9: Methyl hydroxyethyl sulfone
  S-10: Sulfolane

[Solvent (A)]
  DEGDEE: Diethylene glycol diethyl ether
  EGDAc: Ethylene glycol diacetate
  DEGDME: Diethylene glycol dimethyl ether
  PGDAc: Propylene glycol diacetate
  DPGDEE: Dipropylene glycol diethyl ether
  DPGDME: Dipropylene glycol dimethyl ether

[Other Solvent]
  TEGDME: Tetraethylene glycol dimethyl ether
  DMI: 1,3-Dimethyl-2-imisazolidine
  MOZ: 3-Methyl-2-oxazolidine
  EGBEAc: Ethylene glycol monobutyl ether acetate <<Evaluation of Printer Aptitude>>

[Evaluation of Ejection Stability]

Each ink was set in an ink-jet printer provided with a piezo type head having a nozzle diameter of 28 μm, a driving frequency of 15 kHz, a nozzle number of 512, a minimum droplet volume of 14 pl, a nozzle density of 180 dpi (dpi is dot number per 2.54 cm) and a maximum printing density of 1,440×1,440. By using a strobe type ink flight observing apparatus described in FIG. 2 of JP-A 2002-363469, flying situation of ink droplets was monitored by a CCD camera under a condition in which the ejection cycle of the ink droplet and that of lighting was synchronized. The decap property was evaluated according to the following norms to evaluate ejecting stability in an environment of 23° C., 55% RH.

(Evaluation of Decap Property)

After ejecting of ink droplets of each ink droplet was performed for 10 minutes from the above-described ink jet printer, ejection was suspended over 1 minute, 2 minutes and 3 minutes. The visual observation of the ejection state was carried out when ejection of ink droplets was resumed after each interval, and the decap property was evaluated in accordance with the following criteria.

A: Even when the ejection is restarted after an interruption for 3 minutes, there is observed no deficiency such as lack of ejection from the nozzles, curve in the flying direction and decrease in flying speed.

B: When the ejection is restarted after an interruption for 2 minutes, there is observed no deficiency such as lack of ejection from the nozzles, curve in the flying direction and decrease in flying speed. However, when the ejection is restarted after an interruption for 3 minutes, there is observed a nozzle exhibiting deficiency such as lack of ejection from the nozzles, curve in the flying direction and decrease in flying speed.

C: When the ejection is restarted after an interruption for 1 minute, there is observed no deficiency such as lack of ejection from the nozzles, curve in the flying direction and decrease in flying speed. However, when the ejection is restarted after an interruption for 2 minutes, there is observed a nozzle exhibiting deficiency such as lack of ejection from the nozzles, curve in the flying direction and decrease in flying speed.

D: When the ejection is restarted after an interruption for 1 minutes, there is observed a nozzle exhibiting deficiency such as lack of ejection from the nozzles, curve in the flying direction and decrease in flying speed.

<<Formation of Image>>

Each of the inks was charged into an on-demand type ink-jet printer having the maximum recording density of 1,440×1,440 dpi in which a piezo type head having a nozzle diameter of 28 μm, a driving frequency of 15 kHz, a nozzle number of 512, a minimum droplet volume of 14 pl and a nozzle density of 180 dpi and a heater were installed. The ink was ejected onto a polyvinyl chloride recording medium JT5929PM, manufactured by Mactac Co., Ltd., to record a solid image of 10 cm×10 cm. The temperature of the heater was set so that the surface temperature of the recording medium was held at 45° C. by heating from the backside of the recording medium during the printing. The surface temperature of the recording medium was measured by a non-contacting thermometer IT-530N manufactured by Horiba Seisakusho.

<<Evaluation of Formed Image>>

[Evaluation of Abrasion Resistance]

The abrasion resistance of the image formed on a polyvinyl chloride was evaluated according the following criteria by rubbing the image surface by dry cotton with applying a load of 300 g per 1 cm².

A: The image is almost not varied even when the surface was rubbed for 61 or more times.

B: The image density is almost not influenced though damages were slightly formed on the surface of the image after rubbing for 60 times.

C: The image density is lowered during the rubbing for 30 to 59 times.

D: The image density is lowered during the rubbing for less than 30 times.

[Evaluation of Resistivity to Wiping with Alcohol]

The image formed on the polyvinyl chloride was rubbed by cotton cloth impregnated with mixed solution of ethanol and water by 2:1 and resistivity to wiping with alcohol was evaluated according to the following criteria.

A: The image is almost not varied even when the image is rubbed for 41 or more times.

B: The image density is almost not influenced though damages are slightly formed on the surface of the image after rubbing for 40 times.

C: The image density is lowered between 20 times to 39 times of the rubbing.

D: The image density is lowered by rubbing for less than 20 times.

[Evaluation of Resistivity to Image Staining]

The boundary area of an imaging area and a non-image area of each solid image was visually observed. The resistivity to image staining was evaluated in accordance with the following criteria. If a number of splash is generated, minute droplets (satellites) will adhere to the part which should be a non-image area, and the boundary area will be blurred.

A: The boundary area of an imaging area and a non-image area is very clear.

B: The boundary area of an imaging area and a non-image area is clear.

C: The boundary area of an imaging area and a non-image area is blurred to some extent, but it is within the practical tolerable level.

D: The boundary area of an imaging area and a non-image area is blurred which is problematic for practical use.

[Evaluation of Glossiness]

The solid image was subjected to measurement of glossiness at a cast light receiving angle of 60 degree using handy glossmeter PG-1M made by a Nippon Denshoku Industries Co., Ltd. Evaluation of glossiness was performed in accordance with the following criteria. Glossiness represents the reflectivity of each test sample when the reflectivity of the standard plate attached to a glossmeter is set to be 100.

A: The glossiness is 80 or more and it is found extremely excellent in glossiness with visual observation.

B: The glossiness is from 75 to less than 80, and it is found good in glossiness with visual observation.

C: The glossiness is from 70 to less than 75, and it is found acceptable glossiness with visual observation.

D: The glossiness is less than 70, and it is found insufficient glossiness with visual observation.

The results obtained by the above criteria are shown in Table 3.

TABLE 3

| Ink No. | Printer aptitude Decap property | Image properties Abrasion resistance | *1 | Resistivity to image staining | Glossiness | Remark |
|---|---|---|---|---|---|---|
| 1 | A | B | B | A | B | Invention |
| 2 | A | B | B | A | B | Invention |
| 3 | B | B | B | B | C | Invention |
| 4 | D | B | B | D | D | Comparison |
| 5 | D | B | B | D | D | Comparison |
| 6 | A | B | B | A | A | Invention |
| 7 | A | B | B | A | A | Invention |
| 8 | A | B | B | A | A | Invention |
| 9 | A | B | B | A | A | Invention |
| 10 | A | B | B | A | A | Invention |
| 11 | A | B | B | A | A | Invention |
| 12 | A | B | B | A | A | Invention |
| 13 | A | B | B | A | A | Invention |
| 14 | A | B | B | A | A | Invention |
| 15 | A | B | B | A | A | Invention |
| 16 | A | B | B | A | A | Invention |
| 17 | A | B | B | A | A | Invention |
| 18 | A | B | B | A | A | Invention |
| 19 | A | B | B | A | A | Invention |
| 20 | A | B | B | A | A | Invention |
| 21 | A | B | B | A | A | Invention |
| 22 | A | B | B | A | A | Invention |
| 23 | A | B | B | A | A | Invention |
| 24 | A | B | B | A | A | Invention |
| 25 | A | B | B | A | A | Invention |
| 26 | A | B | B | A | A | Invention |
| 27 | A | B | B | A | A | Invention |
| 28 | A | B | B | A | A | Invention |
| 29 | A | B | B | A | A | Invention |
| 30 | A | B | B | A | A | Invention |
| 31 | A | B | B | A | A | Invention |
| 32 | B | B | B | B | B | Invention |
| 33 | D | B | B | D | D | Comparison |
| 34 | A | B | B | A | C | Invention |
| 35 | A | B | C | A | C | Invention |
| 36 | A | B | C | A | C | Invention |
| 37 | B | B | C | B | C | Invention |
| 38 | D | B | C | D | D | Comparison |
| 39 | A | B | C | A | B | Invention |

*1: Resistivity to wiping with alcohol

As are clearly shown by the results listed in Table 3, the ink of the present invention using a fixing resin having "b/a" of 0.020 or less was excellent in decap property, abrasion resistance of the formed image and resistivity to wiping with alcohol. The resistivity to image staining was improved by the effect of preventing the generation of splash. In addition, it was found that the glossiness and decap property were excellent.

Example 2

Images were formed by using Ink 7 prepared in Example 1 on each recording medium described in the following in place of polyvinyl chloride as a recording medium. Abrasion resistance, resistivity to wiping with alcohol, resistivity to image staining and glossiness were evaluated in the same manner as described in Example 1.

Details of the recording medium described in abbreviations in Table 4 are as follows.

PET: Polyethylene terephthalate sheet
PP: Polypropylene sheet
ABS: Acrylonitril-butadiene-styrene copolymer sheet
PC: Polycarbonate sheet
POM: Polyoxymethylene resin sheet
PA: polyacrylate
PI: Polyimide
PVC: Poly vinyl chloride
PE: Polyethylene The result obtained by the above is shown in Table 4.

TABLE 4

| Ink No. | Kind of recording medium | Image properties Abrasion resistance | *1 | Resistivity to image staining | Glossiness | Remarks |
|---|---|---|---|---|---|---|
| 7 | White PET | B | B | A | A | Invention |
| 7 | White PP | B | B | A | A | Invention |
| 7 | Light brown ABS | B | B | A | A | Invention |
| 7 | Aluminum plate | B | B | A | A | Invention |
| 7 | Transparent PC | B | B | A | A | Invention |
| 7 | White POM | B | B | A | A | Invention |
| 7 | White PA | B | B | A | A | Invention |
| 7 | Light yellow PI | B | B | A | A | Invention |
| 7 | Transparent Hard PVC | B | B | A | A | Invention |
| 7 | Transparent Acryl | B | B | A | A | Invention |

TABLE 4-continued

| | | Image properties | | | | |
|---|---|---|---|---|---|---|
| Ink No. | Kind of recording medium | Abrasion resistance | *1 | Resistivity to image staining | Glossiness | Remarks |
| 7 | White PE | B | B | A | A | Invention |
| 7 | Glass plate | B | B | A | A | Invention |
| 7 | White ceramic plate | B | B | A | A | Invention |

*1: Resistivity to wiping with alcohol

The results listed in Table 4 clearly show the followings. It was found that the picture image formed on an image recording medium such as a resin base material containing no plasticizer or a non-absorbing inorganic substrate which was replaced with polyvinyl chloride as a structural element exhibited excellent results in abrasion resistance, alcoholic wiping resistance, resistivity to image staining and glossiness. These results were the same results as given in Example 1.

The invention claimed is:

1. A method for producing a non-aqueous ink-jet ink comprising the step of:
assembling at least an organic solvent, a pigment and a fixing resin,
wherein the fixing resin exhibits an "b/a" value of 0.020 or less, provided that "a" represents a total integrated value of areas of all peaks derived from the fixing resin among all peaks detected by a proton nuclear magnetic resonance analysis; and "b" represents a total integrated value of areas of all peaks derived from a foreign compound contained in the fixing resin.

2. The method for producing a non-aqueous ink-jet ink of claim 1,
wherein the fixing resin exhibits the "b/a" value of 0.010 or less.

3. The method for producing a non-aqueous ink-jet ink of claim 2,
wherein the fixing resin comprises an acrylic resin or a vinyl chloride-vinyl acetate copolymer resin.

4. The method for producing a non-aqueous ink-jet ink of claim 3,
wherein the non-aqueous ink-jet ink comprises Compound (B) comprising at least one compound selected from the group consisting of compounds represented by Formula (1) and Formula (2) in an amount of 1.5% by mass to 30% by mass,

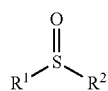

Formula (1)

wherein $R^1$ and $R^2$ each independently represent a group having 1 to 6 carbon atoms, and $R^1$ and $R^2$ may be joined to form a ring,

Formula (2)

wherein $R^3$ and $R^4$ each independently represent a group having 1 to 6 carbon atoms, and $R^3$ and $R^4$ may be joined to form a ring.

5. The method for producing a non-aqueous ink-jet ink of claim 3,
wherein the non-aqueous ink-jet ink comprises Solvent (A) comprising at least one compound selected from the group consisting of compounds represented by Formula (3) and Formula (4) in an amount of 50% by mass to 90% by mass, $$R^5-(OX^1)_2-O-R^6 \qquad \text{Formula (3)}$$

wherein $R^5$ and $R^6$ each independently represent a methyl group or an ethyl group; and $OX^1$ represents an oxyethylene group or an oxypropylene group, Formula (4):

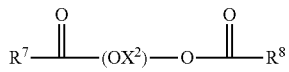

wherein $R^7$ and $R^8$ each independently represent a methyl group or an ethyl group; and $OX^2$ represents an oxyethylene group or an oxypropylene group.

6. The method for producing a non-aqueous ink-jet ink of claim 5,
wherein the non-aqueous ink-jet ink comprises a condensed compound made of a polyallylamine and a polyester having a free carboxylic acid group.

7. The method for producing a non-aqueous ink-jet ink of claim 6,
wherein the non-aqueous ink-jet ink comprises a pigment derivative having an acid group.

8. The method for producing a non-aqueous ink-jet ink of claim 1,
wherein the fixing resin comprises an acrylic resin or a vinyl chloride-vinyl acetate copolymer resin.

9. The method for producing a non-aqueous ink-jet ink of claim 1,
wherein the fixing resin is a resin produced by a suspension polymerization method or a solution polymerization method.

10. The method for producing a non-aqueous ink-jet ink of claim 1,
wherein the non-aqueous ink-jet ink comprises Compound (B) comprising at least one compound selected from the group consisting of compounds represented by Formula (1) and Formula (2) in an amount of 1.5% by mass to 30% by mass, Formula (1)

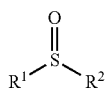

wherein $R^1$ and $R^2$ each independently represent a group having 1 to 6 carbon atoms, and $R^1$ and $R^2$ may be joined to form a ring, Formula (2)

wherein $R^3$ and $R^4$ each independently represent a group having 1 to 6 carbon atoms, and $R^3$ and $R^4$ may be joined to form a ring.

11. The method for producing a non-aqueous ink-jet ink of claim 1,
wherein the non-aqueous ink-jet ink comprises Solvent (A) comprising at least one compound selected from the group consisting of compounds represented by Formula (3) and Formula (4) in an amount of 50% by mass to 90% by mass,

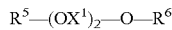 Formula (3)

wherein $R^5$ and $R^6$ each independently represent a methyl group or an ethyl group; and $OX^1$ represents an oxyethylene group or an oxypropylene group, Formula (4):

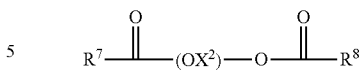

wherein $R^7$ and $R^8$ each independently represent a methyl group or an ethyl group; and $OX^2$ represents an oxyethylene group or an oxypropylene group.

12. The method for producing a non-aqueous ink-jet ink of claim 1,
wherein the non-aqueous ink-jet ink comprises a condensed compound made of a polyallylamine and a polyester having a free carboxylic acid group.

13. The method for producing a non-aqueous ink-jet ink of claim 1,
wherein the non-aqueous ink-jet ink comprises a pigment derivative having an acid group.

14. A non-aqueous ink-jet ink produced by the method of claim 1,
wherein a content of the foreign compound contained in the fixing resin is 0.1% by mass or less based on the total weight of the non-aqueous ink-jet ink when the foreign compound is detected by a proton nuclear magnetic resonance analysis.

15. An ink-jet recording method comprising the step of:
forming an image on a recording medium by using the non-aqueous ink-jet ink of claim 14,
wherein the recording medium is at least one selected from the group consisting of a polyvinyl chloride substrate, a resin substrate without a plasticizer and a non-absorbing inorganic substrate as a constituting element of the recording medium.

* * * * *